United States Patent
Lee et al.

(10) Patent No.: US 8,045,636 B1
(45) Date of Patent: Oct. 25, 2011

(54) MAXIMUM-LIKELIHOOD FRAME SYNCHRONIZATION ALGORITHMS FOR OFDM SYSTEMS

(75) Inventors: Jungwon Lee, Cupertino, CA (US);
Qing Zhao, Santa Clara, CA (US);
Jihwan P. Choi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 814 days.

(21) Appl. No.: 12/057,221

(22) Filed: Mar. 27, 2008

Related U.S. Application Data

(60) Provisional application No. 60/908,273, filed on Mar. 27, 2007.

(51) Int. Cl.
*H04L 5/12* (2006.01)
*H04L 23/02* (2006.01)

(52) U.S. Cl. .................................................... 375/262

(58) Field of Classification Search .............. 375/130, 375/149, 231, 260, 267, 340, 341, 343, 347, 375/350, 354, 355, 368; 370/203, 208, 210, 370/320, 324, 350, 503
See application file for complete search history.

(56) References Cited

U.S. PATENT DOCUMENTS

| | | | | |
|---|---|---|---|---|
| 5,260,976 A | * | 11/1993 | Dolivo et al. | 375/341 |
| 5,359,628 A | * | 10/1994 | Muto | 375/341 |
| 7,092,452 B2 | * | 8/2006 | Taylor et al. | 375/267 |
| 2003/0198303 A1 | * | 10/2003 | Taylor et al. | 375/340 |
| 2005/0249319 A1 | * | 11/2005 | Suh et al. | 375/347 |
| 2005/0265220 A1 | * | 12/2005 | Erlich et al. | 370/208 |
| 2006/0133526 A1 | * | 6/2006 | Zhang et al. | 375/260 |
| 2006/0182193 A1 | * | 8/2006 | Monsen | 375/267 |
| 2006/0215538 A1 | * | 9/2006 | Murthy et al. | 370/208 |
| 2006/0245349 A1 | * | 11/2006 | Vrcelj et al. | 370/210 |
| 2007/0140366 A1 | * | 6/2007 | Rore | 375/260 |
| 2007/0217524 A1 | * | 9/2007 | Wang et al. | 375/260 |

* cited by examiner

*Primary Examiner* — David Payne
*Assistant Examiner* — Syed Haider

(57) ABSTRACT

Autocorrelation algorithms are employed in systems and methods to detect preamble symbols for frame synchronization in WiMAX (Worldwide Interoperability for Microwave Access) or OFDMA (Orthogonal Frequency Division Multiple Access) systems. An ML ("Maximum Likelihood") estimator estimates segment index and frame timing information for an ideal signal scenario. When using the ML estimator, a received time domain signal is sampled. Groups of samples are formed, and the group is further divided into a plurality of portions. Then, an autocorrelation between time domain samples of each portion results in a maximum value which indicates the start of a preamble of the time domain signal. Frame synchronization can then be performed. In other transmission scenarios, the algorithm is modified to use modified estimators of the preamble symbol location. When using the modified estimators, less than all of the portions of samples are compared to one another to find a maximum value.

20 Claims, 10 Drawing Sheets

MAXIMUM-LIKELIHOOD FRAME SYNCHRONIZATION ALGORITHMS FOR OFDM SYSTEMS

RELATED APPLICATIONS

This application claims the benefit of priority from U.S. Provisional Application No. 60/908,273, entitled "Frame Synchronization Algorithms for OFDM Systems," filed Mar. 27, 2007, the disclosure of which is expressly incorporated herein by reference to its entirety.

TECHNICAL FIELD

The disclosure relates to the use of Maximum Likelihood ("ML") autocorrelation algorithms primarily for the detection of preamble symbols for frame synchronization in WiMAX (Worldwide Interoperability for Microwave Access) OFDMA (Orthogonal Frequency Division Multiple Access) systems.

BACKGROUND

Wireless communication devices such as laptops, cell phones, and other devices may use technology such as Worldwide Interoperability for Microwave Access (WiMAX) to enable internet or other types of wireless communication. The devices typically use a technique such as Orthogonal Frequency Division Multiplexing ("OFDM") or Orthogonal Frequency Division Multiple Access ("OFDMA") to modulate a communication signal for wireless communication. Standards-setting bodies assist the development and interoperability of the devices and modulated signal types by creating guidelines such as IEEE 802.16. This creates some uniformity among wireless communication devices from various manufacturers and the signal transmissions between them.

For instance, FIG. 1 shows an example of a geographic area divided into three communication clusters I, II, and III and made up of individual cells A, B, C, . . . A', B', C', . . . A'', B'', C'' . . . . Each cluster has a base station tower T that emits a communication signal to users within the cluster. The signal has a total frequency range f that is divided into portions such that each cell of the cluster communicates using an allocated frequency portion. A user in the cell communicates through their chosen device with the tower T using their allocated frequency portion. As shown in the example of FIG. 1, the frequency portions can be staggered alternately along the vertical frequency axis f to avoid interference. Another frequency allocation, which is not shown, allots multiple frequency slices to each user, with the slices staggered along the frequency axis. Other frequency allocation schemas allocate frequency portions to cells and users based upon the signal strength p of the horizontal axis in order to ensure that the cell and its users are using the strongest possible signal for the cell. Various other tower, frequency allocation schemes, cell configuration, and cluster configuration schemes exist in the art.

Since a communication signal typically has a range of frequency values across a bandwidth, a nomenclature exists in the art to assist with the allocation of frequency values. When discussing a communication signal in terms of frequency, an individual allotment of the frequency range can be called a subcarrier. The subcarrier is typically the smallest practical allotment of a frequency range in a bandwidth for transmission purposes. The subcarriers may be assigned to one or more subcarrier sets, so that the small frequency allotments of the subcarriers can be aggregated for a purpose. Both subcarriers and subcarrier sets may be assigned, through mapping, to subchannels for transmission, which will be discussed below. Subcarriers and subcarrier sets may also be assigned to segments. The segments can be an allotment of frequency assigned to a particular cell A, B, C, . . . within a cluster I, II, or III.

One possible outcome of the above nomenclature results in a particular bandwidth with a particular frequency range or ranges assigned to cluster I. A respective segment of the frequency range may be allocated to each cell A, B, C, D, E, F, and G, with the allocation pattern repeating through clusters II and III and cells A', B', C', . . . A'', B'', C'' . . . , as shown by the small graphs to the left of FIG. 1, in which the vertical axis represents frequency, and the horizontal axis represents power. At a transmission time, one or more subchannels may also be allocated to a user, in order to transmit all, or a portion, of that user's communication. The subchannel may comprise one or more subcarrier sets that may be allocated to transmit the user's communication. This is one example of the many possibilities for subcarrier allocation and nomenclature recognized in the art.

Turning to FIG. 2A, the signal can also be partitioned along a time domain and include various symbols expressed as symbol structures. The symbol structures, e.g. preamble, FCH, DL-Map, DL burst, etc., carry various pieces of information, such as information about the transmitting device, the signal itself, the communication to be transmitted, and the user. The symbols are typically organized in a frame structure, as exemplified in FIG. 2A, and many symbol configurations exist in the art. The symbols are often grouped into alternating links such that a signal transmitted from base station tower T to a user device is often referred to as a "downlink," and a signal transmitted from the user device to base station tower T is often referred to an "uplink." Various methodologies exist in the art to transmit the uplinks and downlinks.

The frame structure of FIG. 2A shows a small portion of a communication signal along a time axis (horizontal axis, t) which exhibits various gaps and symbol structures in slots (k). Segments containing subcarrier sets are conceptually arranged along a frequency axis (vertical axis, s) so that each partition along the vertical axis s represents a single subcarrier. Only a small portion of a single segment is shown in FIG. 2A.

The conceptual subcarrier arrangement of the frame structure allows the subcarriers to follow a logical ordering. The frame structure is, then, a logical representation of the actual signal transmission, with the frame structure symbols arranged logically into blocks using time slots k.

Typical frame structure symbols, such as a preamble symbol structure ("Preamble"), Frame Control Head (FCH), uplinks (UL), downlinks (DL), gaps (TTG or RTG), various maps, and bursts are included. As is typical, a series of symbols make up each portion of the frame structure, and, for the example shown in FIG. 2A, the segment shown includes all subcarrier sets and their corresponding subcarriers, though multi-segment frames are possible.

For transmission purposes, the symbols of the frame structure are mapped to their actual transmission locations in the frequency domain. That is, the subcarriers are assigned to frequency portions, which can be out of sequence with respect to the logical ordering of the frame structure. This mapping is typically achieved through one or more processes, including an interleaving process, data randomization, channel coding, rate matching, and the use of modulation constellations.

Turning to FIG. 2B, in which the horizontal axis represents frequency and the vertical axis represents signal amplitude, the assignment of subcarriers to frequency portions would result in the logical subcarrier arrangement of the frame structure being dispersed along the frequency domain according to the rules of the chosen mapping processes. The subcarriers would appear to be either grouped adjacent one another, or would appear scattered along the frequency domain, but in both instances, would follow some ordering scheme. The resulting structure is referred to as a transmission subchannel, which is another logical collection of subcarriers, in that the subchannels comprise groups of subcarriers that are logical to transmit at a point in time on a given subchannel. The subchannel can also include customary guard, pilot and DC subcarriers, in addition to data subcarriers. The example of FIG. 2B shows that subcarriers for one symbol of FIG. 2A have been dispersed along the frequency domain.

After sorting the frame structure symbols into appropriate subchannels, the signal is transmitted in bursts. Typically, the burst size and duration are also factors for determining which subcarriers of which preamble symbol structure are arranged on a particular subchannel. The bursts are then routed between towers, and ultimately a user's information is routed to that user. The towers and user devices are capable of extracting the information in the signal, typically by using a technique that compliments the mapping, interleaving, data randomization, channel coding, rate matching, and/or modulation constellations used to create the signal.

Many difficulties may arise in wireless communication because of signal distortions or interruptions during transmission. Because of this, techniques have been developed to ensure that a usable signal is properly transmitted and received. One such technique uses a preamble symbol structure as the first symbol structure of a downlink transmission. The preamble symbol structure is used to provide a reference for frame synchronization. The preamble symbol structure establishes fixed relationships among subcarriers of the signal and indicates the start of the downlink. The fixed relationships established through the use of the preamble symbol structure allow the devices, mobile stations, and the network to use or continue to transmit the information contained in the signal by minimizing the effects of distortions and interruptions. This can be achieved, for example, by using the preamble symbol structure to adjust a timing offset, a frequency offset, or transmitted signal power.

The preamble symbol can be arranged in many ways to achieve a usable reference for frame synchronization. The most common techniques create detectable differences in the subchannel portions carrying the preamble. Some examples include power boosting the preamble symbols to a higher dB value than the other symbols, using different modulation techniques, or allocating the subcarriers in a particular pattern. Different techniques are then used to detect the preamble symbol and access the references, and include variations of minimum mean square error (MMSE), ordered successive interference cancellation (O-SIC), and maximum-likelihood detection (MLD). Of these techniques, MLD offers an optimal tradeoff between technique complexity and performance.

As a further example of preamble symbol detection, one traditional technique may identify the preamble symbol structure by using energy detection to find a time gap between uplinks and downlinks. Then, the technique differentiates between uplinks and downlinks to find the preamble symbol structure. However, in this technique, the signal can have a poor signal-to-noise ratio (SNR), that is, the signal strength is weak when compared to noise. It is then difficult to identify the time gap, and the energy detection fails.

Other conventional techniques may use power differentiation between regular signals and preamble signals, typically boosting the preamble symbol structure power above that of the regular signals. These systems require numerous calculations that may be impractical in certain applications.

The shortcomings of the prior art systems may make frame synchronization difficult. It is therefore desirable to provide improved identification of a preamble symbol for frame synchronization.

SUMMARY

Consistent with the invention, systems and methods are provided for determining the start of a sequence in a signal in the time domain. In certain embodiments, the method comprises sampling the signal in the time domain to obtain a plurality of samples, dividing each of the plurality of samples into a plurality of portions, calculating the correlation between the plurality of samples in the portions; and identifying a portion of the received signal frame as comprising the desired symbol based on the correlation values.

Another method consistent with the invention may comprise identifying the start of a preamble symbol in a time domain signal, sampling the signal in the time domain to obtain a plurality of samples, and, for each of the samples, forming a group of samples having a length of a preamble symbol, dividing the group into a plurality of portions, and calculating a likelihood value representing a correlation between the portions in the group. The first sample of the group with the maximum likelihood value can then be identified as the start of the preamble symbol.

Alternatives exist for a communication signal with frames containing symbols. The frames can be synchronized and a segment index can be determined, which can comprise estimating and compensating for a carrier frequency offset and obtaining a signal-to-noise ratio. The frames can also be synchronized and a fractional carrier frequency offset can be estimated, which can comprise obtaining a signal-to-noise ratio. Alternatively, the frames can be synchronized without knowing a-priori, a signal-to-noise ratio.

Another method consistent with the invention may comprise identifying a desired symbol in a signal of a communication transmission, the signal comprising, in a frequency domain, only one modulated subcarrier set while other subcarrier sets are not modulated, thereby making the other subcarrier sets silent. The method may comprise sampling the signal in the time domain; dividing the sampled signal into portions; locating a signal portion comprising the desired symbol within the plurality of signal portions. The locating may comprise obtaining a segment index and a delay for at least one of the plurality of symbol structures; autocorrelating to calculate similarities between the signal portions; and using the calculated similarities to select a signal portion as the most likely portion to comprise the desired symbol. The method may then output an indicator of the desired symbol. When obtaining a segment index and a delay, the method may comprise at least one of estimating or detecting.

Also provided is a method for frame synchronization of a signal, the signal comprising a frame structure, the frame structure comprising a preamble symbol structure, the preamble symbol structure comprising only one modulated subcarrier set among a plurality of available subcarrier sets, and each subcarrier set comprising subcarriers. The method may comprise the steps of receiving a signal; sampling the received signal; exploiting a similarity caused by repeated signal portions using an autocorrelation; calculating power characteristics of the received signal; determining which portion of the received signal most likely contains a preamble symbol; and synchronizing frames of the received frame structure using the results of the determination.

The frame synchronization method may also comprise the step of estimating a segment index and a frame timing delay of the sampled signal before exploiting the similarity. The autocorrelation may compare less than the total number of similar signal portions. The autocorrelation may use the results of a normalized estimator. The method may also comprise the step of applying working assumptions to frame structure variables.

The carrier frequency offset ("CFO") can also be normalized before estimating the segment index and the frame timing delay. Then, the frame synchronization may comprise the step of assuming a carrier frequency offset ("CFO") characteristic of the sampled signal before estimating the segment index and the frame timing delay. Or, the frame synchronization may comprise the step of obtaining a fractional carrier frequency offset ("CFO") characteristic of the sampled signal.

Alternatively, the method of frame synchronization may further comprise the steps of obtaining a frame timing delay characteristic of the sampled signal and obtaining segment index and integer CFO characteristics of the sampled signal.

It is to be understood that both the foregoing general description and the following detailed description are exemplary and explanatory only and are not restrictive of the invention, as claimed.

The accompanying drawings, which are incorporated in and constitute a part of this specification, illustrate several embodiments consistent with the invention and together with the description, serve to explain the principles of the invention.

DETAILED DESCRIPTION

Reference will now be made in detail to the embodiments, an example of which is illustrated in the accompanying drawings. Wherever possible, the same reference numbers will be used throughout the drawings to refer to the same or like parts.

Figure 1:
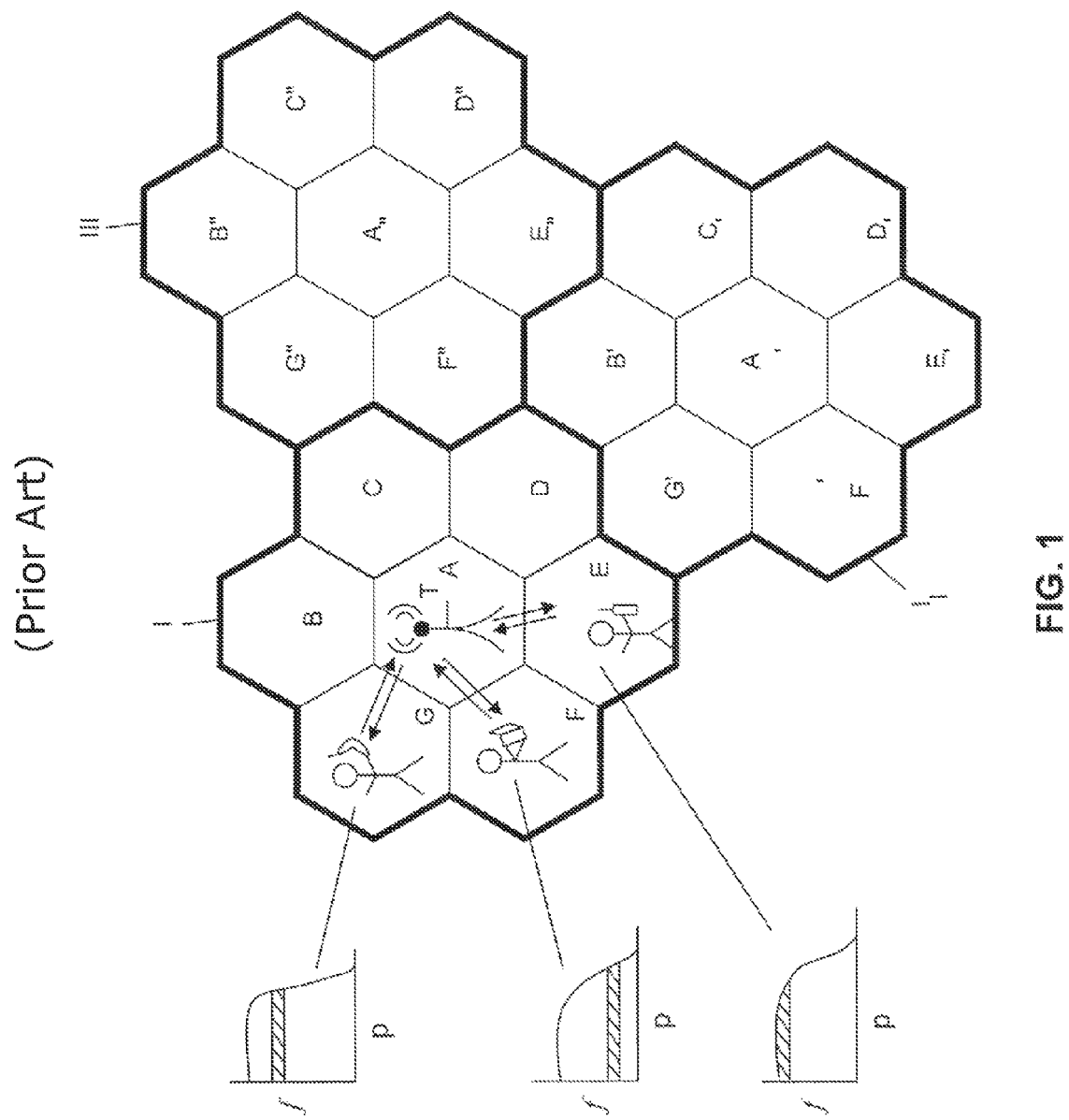
FIG. 1 is an example of a conventional geographic area and associated communication cluster constituting an environment in which the disclosed structures and methods may operate.
Figure 2A:
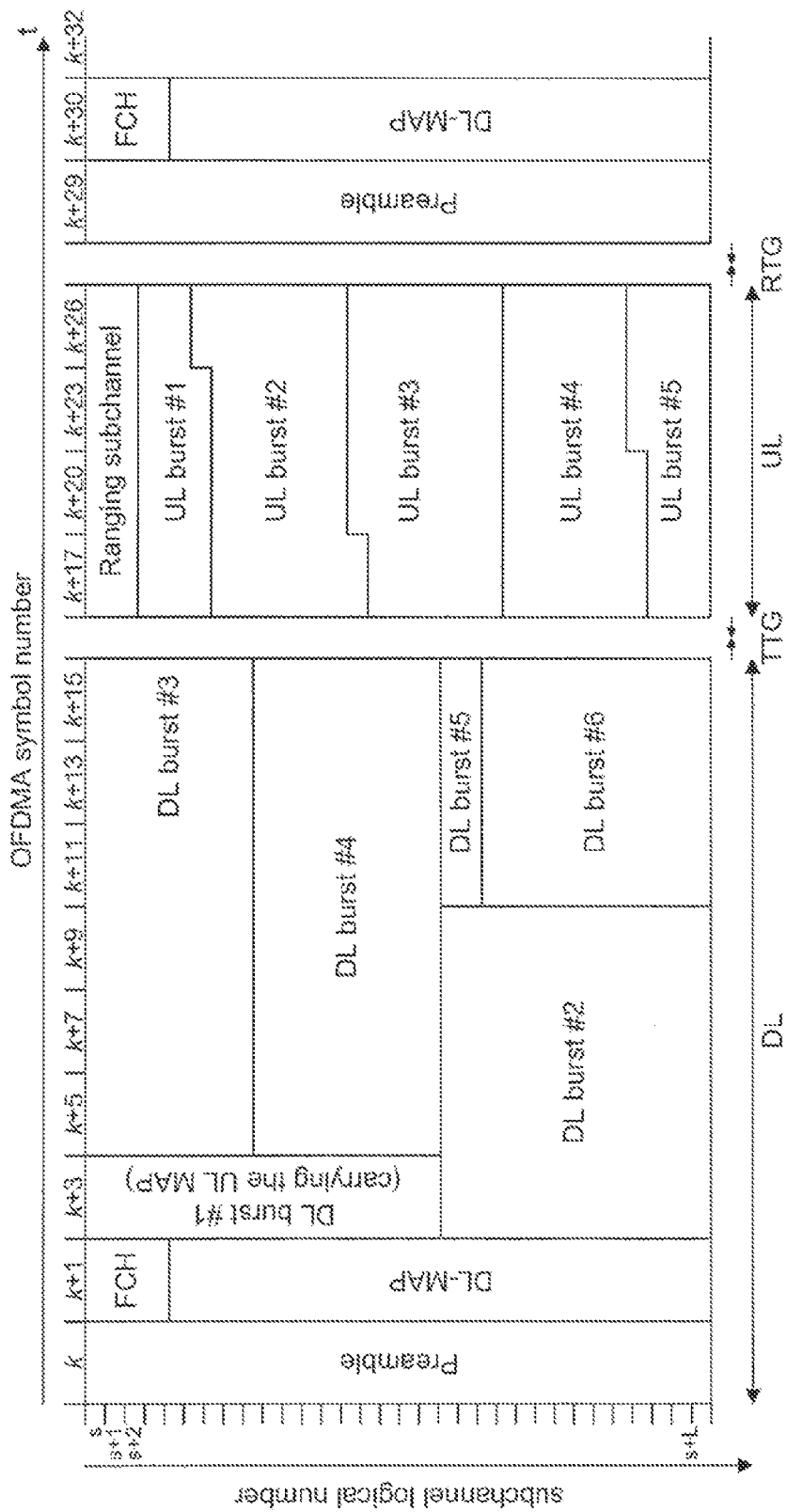
FIG. 2A is an example of a conventional frame structure of a OFDMA system.
Figure 2B:
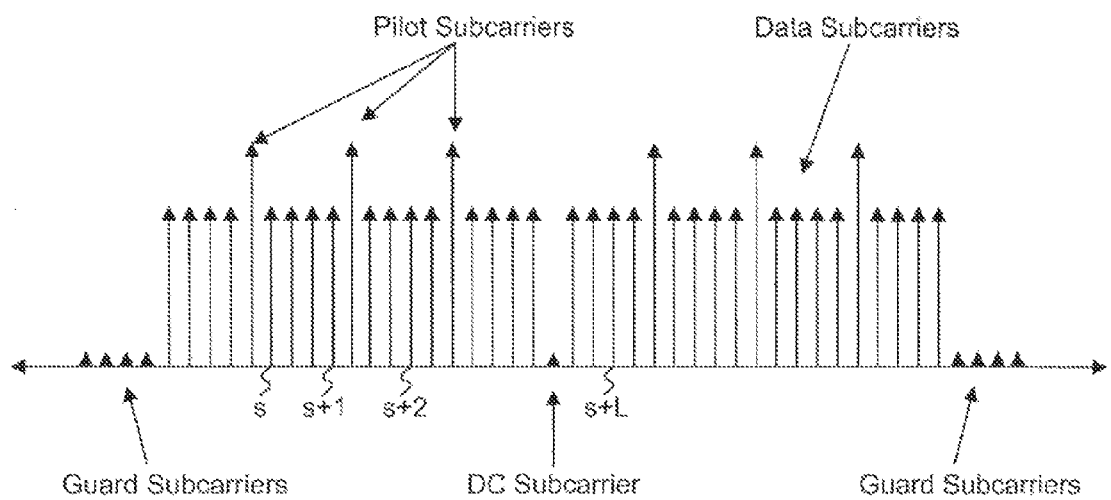
FIG. 2B is an example of a subchannel comprising various subcarriers.

As shown in FIG. 2A, the first portion of the downlink (in time, viewing from left to right) is a preamble symbol structure, which must be detected for frame synchronization to occur. The typical preamble symbol structure contains information about the IDCell and segment. That is, the preamble symbol structure contains information regarding which tower T, in which cell A, B, C . . . , is communicating the signal. It also indicates which segment of a logical frame structure a particular communication is on. Therefore, the value, or pattern, of each preamble symbol will be different from the others because of the base station tower T and segment chosen.

Therefore, when generating a subchannel for a preamble symbol, one of 114 different preamble symbol structure patterns are available based on the base station tower T's IDCell and segment. Once one of the 114 preamble symbol structure patterns is chosen, individual subcarriers within the segment are appropriately modulated to reflect the choice. So, for traditional OFDMA signals, a different pilot subcarrier set reflects the chosen segment for the base station tower T. After the preamble symbol structure pattern is properly chosen, an Inverse Fast Fourier Transform (IFFT), or reverse IFFT, is performed, converting the signal into a time domain, and a cyclic prefix is added.

The chosen preamble symbol structure pattern appears in the time domain in the form of pilot subcarriers. The pilot subcarriers are traditionally used to synchronize the receiver of a signal to a transmitter of the signal by means of phase, frequency and timing considerations. When the pilot subcarriers are modulated to reflect the preamble symbol structure pattern, different pilot subcarrier sets are chosen depending on the segment assigned to the particular tower. Pilot subcarriers typically are known by receiving base stations and can be used for correcting the magnitude, or power, of a signal, or for correcting phase shift offsets, or distortions, in a transmitted signal.

When receiving the signal, a traditional system will perform a Fast Fourier Transform (FFT) on the received time domain signal to discover the imbedded information. However, if the FFT is performed on the time domain signal beginning at a point that does not coincide with the start of the sought signal, performing the FFT on the signal may not easily discover the portion carrying the preamble.

It is known in th art that to facilitate the identification of the preamble symbol structure from the other symbol structures of the frame structure, the power, modulation, and subcarrier allocation of the preamble symbol structure can be made unique. As a first example, the power can be boosted above that of the regular symbols, for example, to 4 dBs. As a second example, the modulation of the preamble can be, for example, BPSK ("Binary Phase Shift Keying") while the remainder of the signal may use QPSK ("Quadrature Phase Shift Keying"). Different permutations of QAM are also possible. As a third example, the subcarrier allocation can be different from the other frame symbol structures. As noted above, however, various difficulties exist with conventional methods of distinguishing the preamble symbol structure.

Figure 3A:
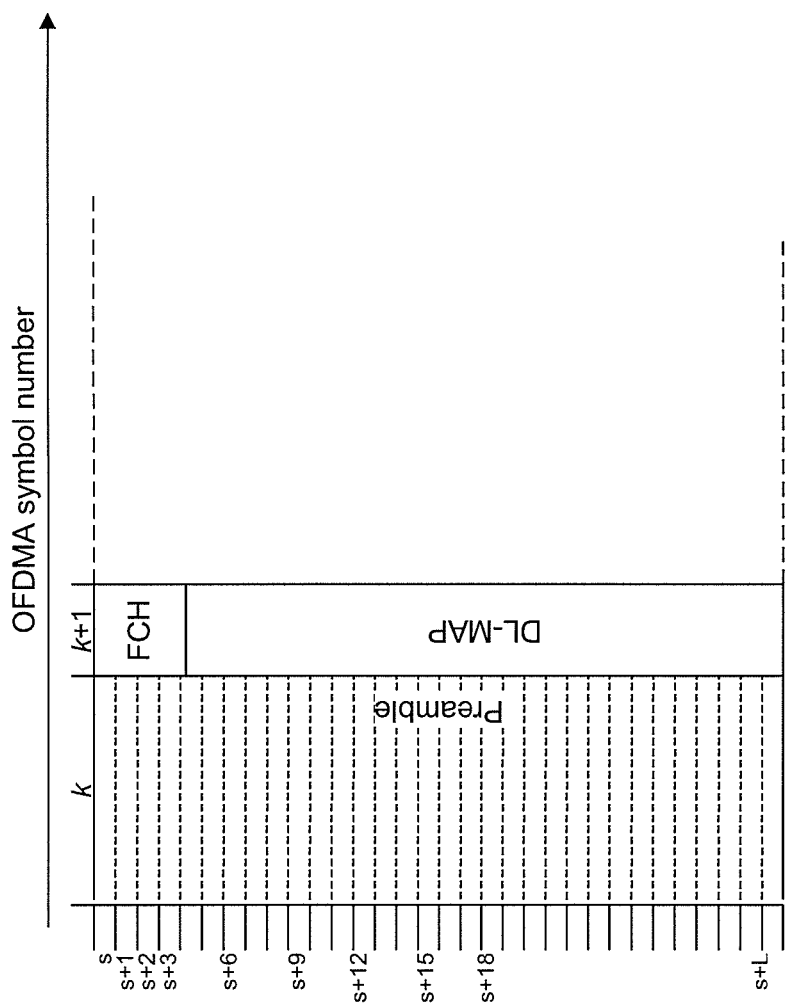
FIG. 3A is an example of a preamble OFDMA symbol structure, consistent with the present invention.
Figure 3B:
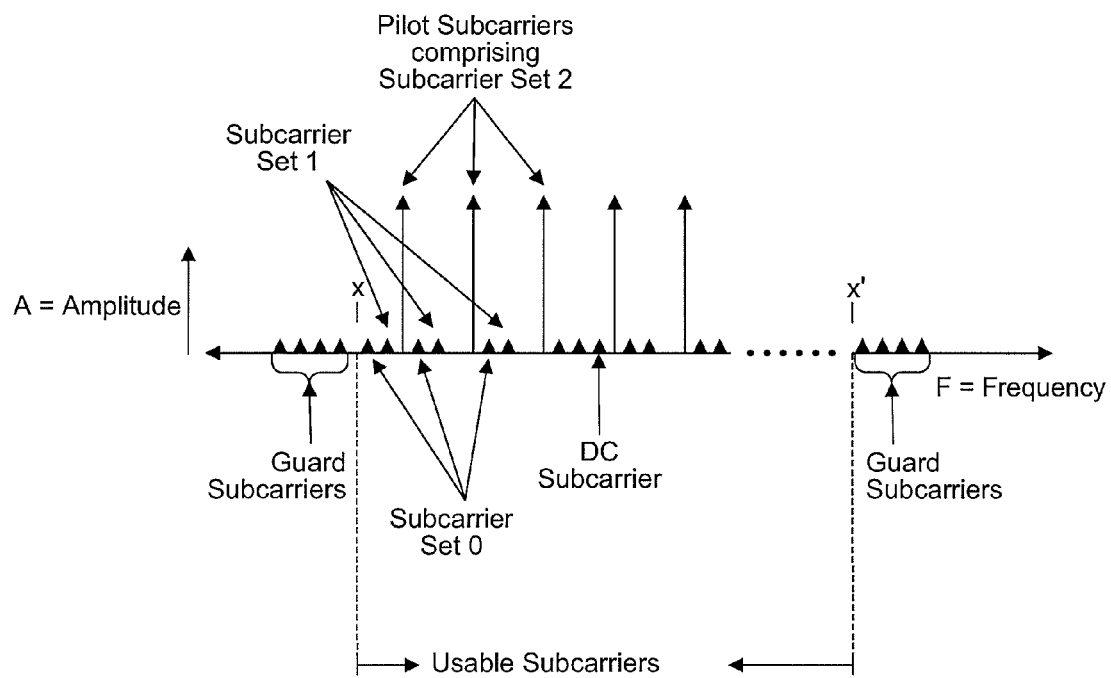
FIG. 3B is an example of a subchannel comprising a subcarrier set for the preamble symbol structure, consistent with the present invention.

Turning to FIGS. 3A and 3B, and consistent with the present invention, the received preamble symbol may be identified by differentiating the subcarrier allocation for the preamble symbol structure from the other frame structure symbols, prior to converting the signal from the time domain to the frequency domain.

FIG. 3A shows an example of a portion an OFDMA frame structure, with the subcarriers extending along the vertical (frequency) axis and the various frame structure symbols extending along the horizontal (amplitude) axis. As shown in FIG. 3A, the subcarriers extend along the vertical axis and carry information for the frame structure symbols. However, the preamble of the frame does not carry information on the subcarriers in the same way as the other frame structure symbols. Instead, each subcarrier set of the preamble symbol structure can be defined according to, for example, OFDMA standards, or other user definitions. Also, the number of subcarrier sets can be selected according to, for example, OFDMA standards, or other user selections. In this way, the preamble can comprise features that are standardized for WiMAX and IEEE transmissions.

The preamble symbol is differentiated from the remaining signal symbols by pilot allocation. A common technique is to construct a subcarrier set by selecting every K subcarriers for inclusion in the set. The selected subcarriers are thus equally spaced over the band of interest, and can be understood by upsampling in the frequency domain, leading to signal repetition in the time domain. Then, as shown in FIG. 3B, the result in the time domain is a transmission signal that is unique from the other symbol signals. The preamble symbol structure is mapped to only one subcarrier set, and the upsampling provides a repetition of the subcarrier set selection in the time domain. The total number of repetitions within the preamble is equal to K, which in this example is three.

Consistent with the present invention, when receiving the signal, all useful subcarriers for a preamble are separated into three subcarrier sets. That is, K is equal to three. This is accomplished by selecting each third subcarrier into a subcarrier set. The example shown in FIG. 3B shows the useful subcarriers are separated into three subcarrier sets and only one of them is modulated. FIG. 3B shows an exemplary subcarrier index for explanation purposes only. Here, the chosen exemplary pilot subcarrier modulation scheme creates a pattern where two subcarriers are followed by a pilot subcarrier. The first four subcarriers are allocated to guard subcarriers, for illustration purposes. The next two subcarriers are usable for carrying subcarrier sets, but are not modulated. The preamble, shown in FIG. 3A, is mapped to data subcarrier set 2, with the remaining subcarriers comprising subcarrier sets 0 and 1 and any DC subcarriers.

When using three subcarrier sets, each third subcarrier along the frequency domain, not allocated for a purpose such as guard or DC, can be used to generate the preamble. The preamble symbol sought by an ML estimator for frame synchronization may then be composed of only one subcarrier set, with the other two subcarrier sets silent as to the desired preamble symbol sought.

This allows for a situation where the whole frequency band of the subchannel is not used, and only one subcarrier set is used for preamble detection.

Figure 4:
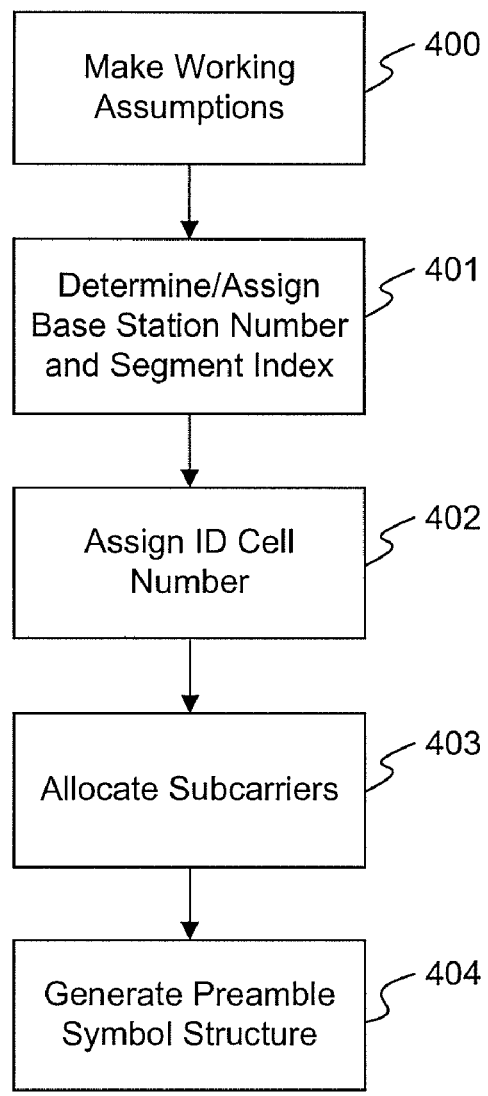
FIG. 4 is a flow diagram of a preamble symbol and preamble symbol structure creation method, consistent with the present invention.

Turning to FIG. 4, there is shown a method for formulating a preamble symbol structure. This method creates a desired preamble symbol pattern for inclusion in a preamble symbol structure. The preamble symbol is structured so that, upon receipt of a communication signal, the desired preamble symbol may be identified and used for frame synchronization purposes.

To find the repeated signal of the preamble symbol within the preamble OFDMA symbol structure, certain working assumptions are used when formulating the preamble symbol at step 400, though the Maximum Likelihood algorithm can still find a result if all assumptions cannot be made. The preamble formulation assumes there is no cyclic prefix (CP); there is no carrier frequency offset (CFO); there are no guardband subcarriers; there is no gap between uplink subframes and downlink subframes; there is an additive white Gaussian noise channel; the number of total subcarriers, N, is a multiple of the total number of subcarriers in the frame, which is ideally 3; the SNR is known a-priori; and the signal from only one segment is received, even when the segment index is unknown.

After making the assumptions, customary information may be included in the preamble symbol structure. This includes, at 401, assigning or determining a base station number for which tower T of a cell A, B, C . . . is being used. Since each base station has a particular frequency band associated with it, this step necessarily involves assigning the segment index. The segment index indicates which segment in the frequency domain is being used for the communication. Then, at 402, an IDCell number is assigned for the cell A, B, C . . . being used.

At 403, the subcarriers are allocated, where one of the subcarrier allocations yields a repetition pattern that indicates the preamble symbol structure. The selected subcarrier sets may be modulated by one of 114 preamble patterns. Finally, the preamble symbol structure, with the desired pattern, is generated at 405. The preamble symbol structure can then be included in a downlink transmission of a communication signal.

Figure 5:
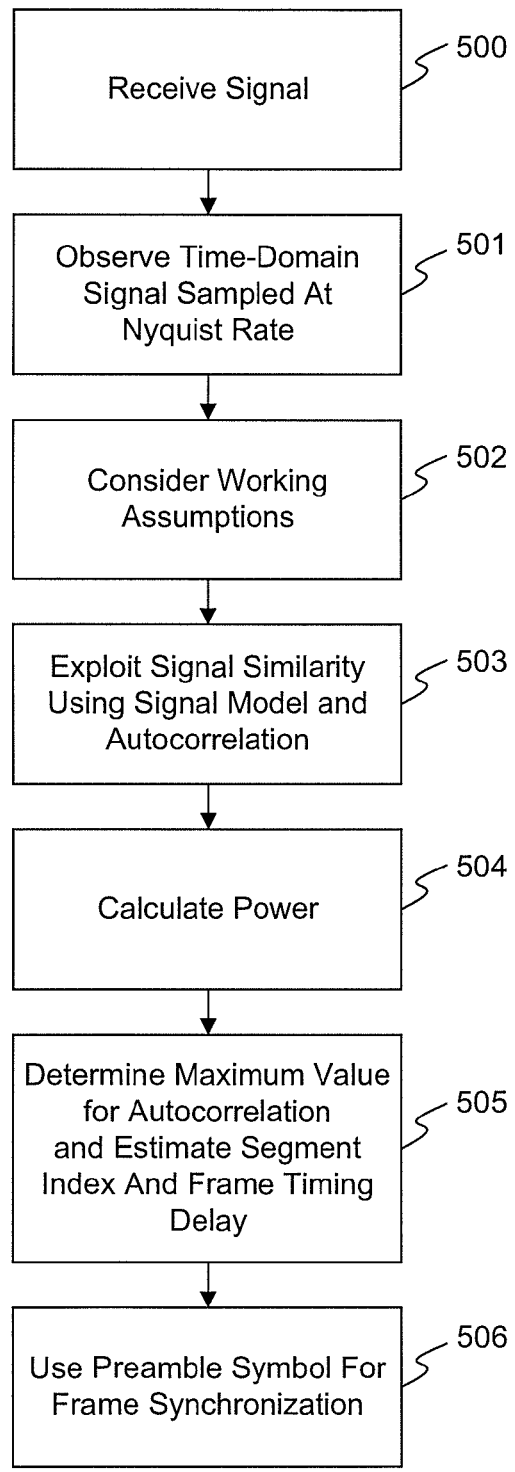
FIG. 5 is a flow diagram of a Maximum Likelihood preamble symbol detection method, consistent with the present invention.

Referring now to FIG. 5, there is shown a method for using an initial process to find the desired preamble symbol of a received signal. At 500 the signal is received. At 501, the signal, still in the time domain, is sampled at a Nyquist rate. The Nyquist rate is the minimum rate at which the received signal can be sampled without losing information contained in the signal. And at 502, working assumptions that were made during the preamble formation above at 400 may be considered.

At 503, an initial signal model is used to locate and identify the desired preamble symbol. A segment index s and frame timing delay $\tau$ are estimated. The signal model uses:

$$y[n]=x_s[n-\tau]+z[n]$$

where:
y[n] is the received time-domain signal sampled at the Nyquist rate
$x_s[n]$ is the transmitted signal for a segment s $$x_s[n+l \times N/3]=x_s[n]e^{j2\pi ls/3}, \text{ for } n=0,\ldots (N/3)-1 \text{ and } l=0,1,2$$

where:
n is the sample index in the frame
N is the total number of samples in each OFDM symbol, given the Nyquist sampling rate
l is the index of repeated signal portions with the preamble;
s is the unknown segment index
z[n] is white Gaussian noise
$\tau$ is the unknown frame timing delay The signal model assists with detecting the location of the preamble symbol by estimating s and $\tau$ from the observation of y[0], y[1], . . . , y[MN−1], where M is the number of symbols in one frame of the frame structure.

An optimal frame timing delay and segment index can be found using:

$$(\hat{\tau}, \hat{s}) = \arg \max_{(n,p)} \{\gamma(n, p) - \rho \Phi(n)\}$$

This equation detects $\tau$ in order to find the first symbol of the downlink, which is the preamble of the WiMAX frame. Also, the segment, s, in which the preamble symbol is located is detected, and thereby the segment index is detected. The equation uses n, the sample index in the frame, and p, a phase characteristic of the sample. The values ρ and Φ(n) are defined below. Once γ(n, p), ρ, and Φ(n) are determined for each possible sample, the above equation finds the optimal frame timing delay and segment index. After selecting the optimum values, using a cost function, it can be determined which sample indicates the start of the portion of the signal that is most likely the preamble symbol.

The above equation exploits the signal similarity among signal portions in the preamble.

When the signal is received, it is sampled in the time domain. A first sample is assumed to be the start of the preamble symbol. The N samples following the first sample can then be divided in to three signal portions, each portion having one third of the sampled signals. Samples from zero to [(N/3)−1)] are in the first signal portion. Samples from [(N/3)−1] to [(2N/3)−1] are in the second signal portion. And, samples from [(2N/3)−1] to (N/3) are in the third signal portion.

The exploitation occurs at 505, and γ(n, p), below, calculates the autocorrelation between the samples of the three portions of the signal. γ(n, p) obtains values for each received sample, by comparing each sample of each portion to the other samples of the other portions. Then the first sample of the grouping having the largest value is identified as the start of preamble.

The first part of the equation γ(n, p) calculates the similarity between the samples of the first signal portion and the second signal portion, the second part of the equation calculates the similarity between the samples of the second signal portion and the third signal portion, and the third part of the equation calculates the similarity between the samples of the first signal portion and the third signal portion. The autocorrelation can be expanded for changes in the value of l. The expansion accommodates situations where the subcarrier allocations that lead to periodic signal patterns in the time domain are in multiples other than 3.

$$\gamma(n, p) = \mathrm{Re}\left\{ \sum_{m=n}^{((n+N/3-1))MN} \left( y^*[m]y\left[m+\frac{N}{3}\right]e^{\frac{j2\pi p}{3}} + y^*\left[m+\frac{N}{3}\right]y\left[m+\frac{2N}{3}\right]e^{\frac{j2\pi p}{3}} + y^*\left[m+\frac{2N}{3}\right]y[m]e^{\frac{j4\pi p}{3}} \right) \right\}$$

N, M are as defined above.

Next, the energy term Φ(n) of the preamble are calculated at 504 using:

$$\Phi(n) = \sum_{m=n}^{((n+N/3-1))MN} \left( |y[m]|^2 + \left|y\left[m+\frac{N}{3}\right]\right|^2 + \left|y\left[m+\frac{2N}{3}\right]\right|^2 \right).$$

The coefficient ρ carries information regarding signal-to-noise power ratio (SNR) and is defined according to:

$$\rho = \frac{\sigma_x^2}{\sigma_x^2 + \sigma_z^2} = \frac{SNR}{SNR+1}$$

where $\sigma_x^2$ is the average signal power and $\sigma_z^2$ is the average noise power. It is assumed both can be estimated before frame synchronization.

Then $(\hat{\tau}, \hat{s})$ are solved for, and the optimal frame timing delay and segment index are found.

With the most likely signal portion containing the preamble symbol found, frame synchronization can occur at 506. Subsequent processing can include conversion of the time domain signal to the frequency domain using FFT, and the use of algorithms to discover which of the 114 pilot sequences was used.

As a specific example of the equations set forth above, using the parameters discussed above, a method for identifying the beginning of a preamble, having a length R, in a time domain signal includes sampling the signal in the time domain to obtain a plurality of samples. For each of the samples, a group is formed having a number of successive consecutive samples N equal in time to R. Each of the groups is divided into three portions. For each of the groups, a likelihood value is calculated representing a correlation between the portions in the group. Then, the first sample of the group with the maximum likelihood value is identified as the start of the preamble.

Other embodiments may be employed to accommodate other situations, such as extending an Additive White Gaussian Noise ("AWGN") channel to multipath fading channels; the existence of unknown CFO; the received signals comprising more than one segment, or in-band interference from neighboring base station towers T; and, situations such as, signal frame properties, such as cyclic prefix, guard-band subcarriers; gaps between uplink and downlink subframes, and multiples of subcarrier sets other than three.

A multipath fading channel introduces inter-symbol interference between symbols of the frame structure, so it partially corrupts the signal repetition within the preamble. To accommodate multipath fading, assume the multipath fading channel is time-invariant over one OFDMA symbol duration. Assume the channel changes between symbols, but it is fixed during one OFDMA symbol. The effects of corruption due to inter-symbol interference can be eliminated or reduced by appending a cyclic prefix at the beginning of each OFDMA symbol. As long as the maximum delay spread of the multipath channel is less than the cyclic prefix, there will be no inter-symbol interference leaked into the useful data portion. In addition, despite the introduction of additional signal repetition, the use of the additional signal repetition caused by the cyclic prefix to assist with frame synchronization is optional. The ML estimator can then be applicable to multipath fading channels, even when using a cyclic prefix.

When signals are received at a tower T from more than one segment (corresponding to more than one cell), the signal from the undesired segments can be treated as co-channel interference, which can partially destroy the signal repetition pattern of the preamble symbol. The interference from the other base station towers can also distort the preamble symbol structure. The performance of the ML frame synchronization algorithm is correspondingly degraded. In the worst case, the signals from the other segments may be received at equal strength p by a mobile station. In this case, a signal is received from each of cells A, A', and A". The signal repetition pattern in this example is completely destroyed. So, if a mobile user is located on a fringe of three base stations towers, then the received signal, with its repetition pattern, is destroyed.

The ML estimator is still applicable to situations where co-channel interference occurs. This is because the above worst case is rare. And, even when it does occur, the mobile station can step out of the interference situation quickly due to the movement of the mobile station and surrounding objects, which makes the fading small-scale fading.

In another scenario, guard-bands may exist in the transmission system in order to separate the subcarriers. This would result in guard-bands interposed between subcarriers s in FIGS. 2A and 3A. The guard-bands are typically used for safety, but can cause a small amount of correlation between signals with even regular OFDM symbols. Therefore, it is sometimes desirable to exploit the repetition of the preamble symbol while avoiding the exploitation of the correlation introduced by the guard-band, because doing so is complicated. Practically, it is also possible to ignore the guard-band, with only a slight degradation in the ML estimator performance. The guard-band can be ignored because the correlation due to the guard-band is very small as compared to the strong correlation between different portions within preamble symbol.

Ideally, the other symbols would not have a repetition pattern, so that the autocorrelation for these symbols would be zero by ignoring the small correlation introduced by guard-band.

The existence of gaps TTG or RTG between downlink and uplink subframes does not affect the frame synchronization determination in the same way as in the prior art determinations. Even though the gaps are filled with Gaussian-distributed noise, the ML estimator is applicable at no cost. The reasons for this is mostly due to there being no correlation yielded from the noise.

When the total number of N for one OFDM symbol, or the size of FFT, is not a multiple of 3, the signal repetition in time is slightly distorted. This reduces the correlation coefficient between two repeat parts from 1. So, for the example N=1024, the correlation coefficient is reduced to 0.9, and can be lower in some embodiments.

The ML estimator is still applicable in this case even though the performance is slightly degraded. This is because the slightly degraded correlation is still strong compared to other correlations within the OFDMA signal.

When using an oversampling rate that is a multiple of 3, the signal repetition in time can be completely preserved. This multiple of three may be advantageous when following WiMAX standards.

CFO ("Carrier Frequency Offset") is a frequency instability that can destroy the orthogonality, or orientation, among subcarriers. This destruction can lead to intercarrier interference, which blurs the signal.

Figure 6A:
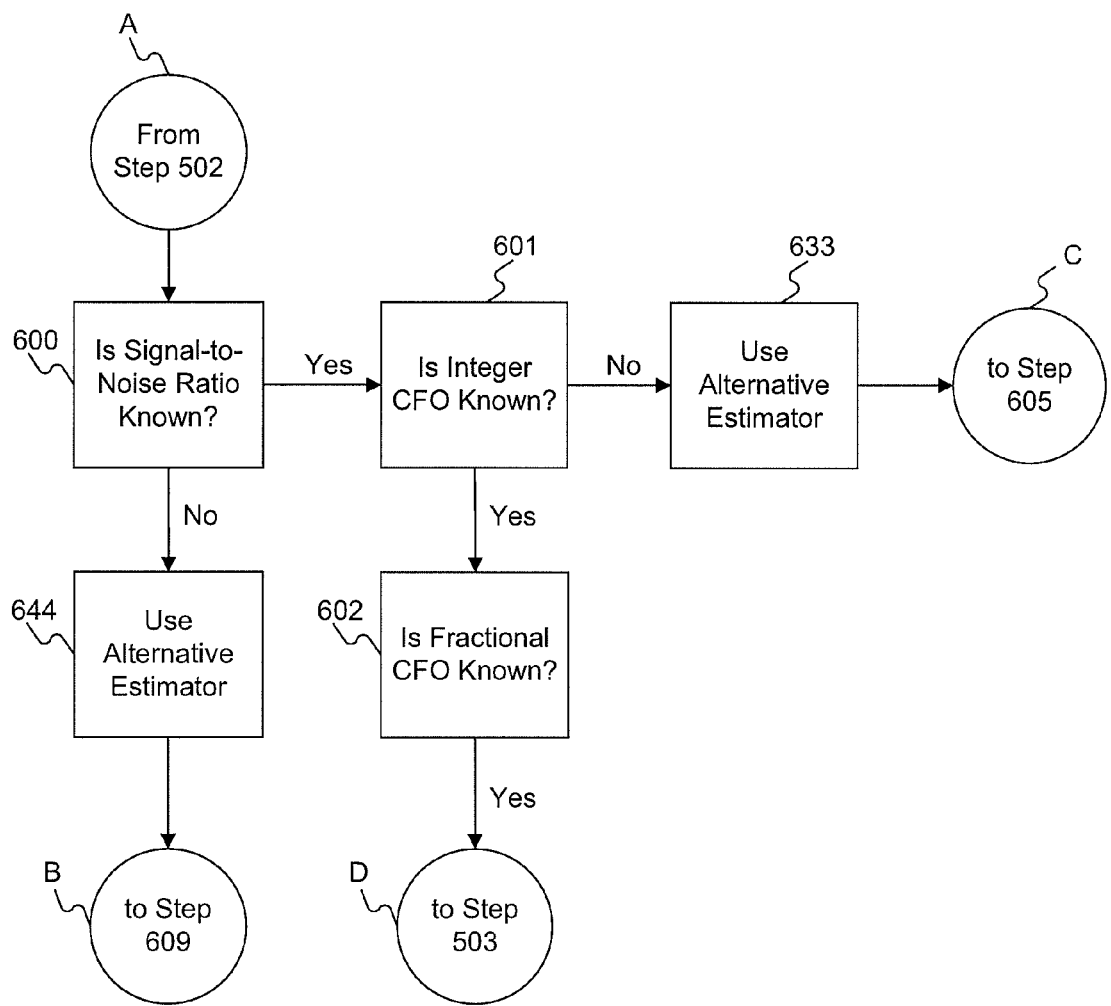
FIG. 6A is a flow diagram of a modified preamble symbol detection method, consistent with the present invention.

Turning to FIG. 6A, when a CFO is present, and unknown, several alternatives exist for accommodating CFO during frame synchronization. These alternatives can be performed at A, which indicates that it is after step 502 (FIG. 5).

The method indicated in FIG. 6A first involves a determination of whether the signal-to-noise ration (SNR) is known, at step 600. If the SNR is known, as a first alternative, and using a simplified explanation, it is typical to normalize the CFO in terms of subcarrier spacing, by representing the CFO as the sum of an integer part and a fractional part. The ML estimator can then jointly solve for the frame timing, segment index, and CFO. This alternative determines the segment index of a received signal by checking the corresponding phase shifts between repeated signals in the time-domain. Therefore, at step 601, the system determines if the integer CFO can be known.

However, integer CFO may cause the same phase shift as when having used a different subcarrier set for transmitting the preamble symbol. When this occurs, it is hard to differentiate a signal using a segment with an index of one, with zero CFO subcarrier spacing, from the signal using a segment with a zero index, with one CFO subcarrier spacing. The unknown CFO must then be limited to the range of $-\frac{1}{2}$ to $+\frac{1}{2}$. This involves assuming a coarse CFO estimation has been done before the frame synchronization to remove the integer CFO portion so that only the fractional CFO is left. At step 602, then, the fractional CFO can be known, and, at D, the process can return to step 503.

However, the removal of the integer portion may be difficult to do before frame synchronization, so a second alternative algorithm may be used at 633, using an alternative estimation. At C, the method continues to step 605 of FIG. 6B.

Figure 6B:
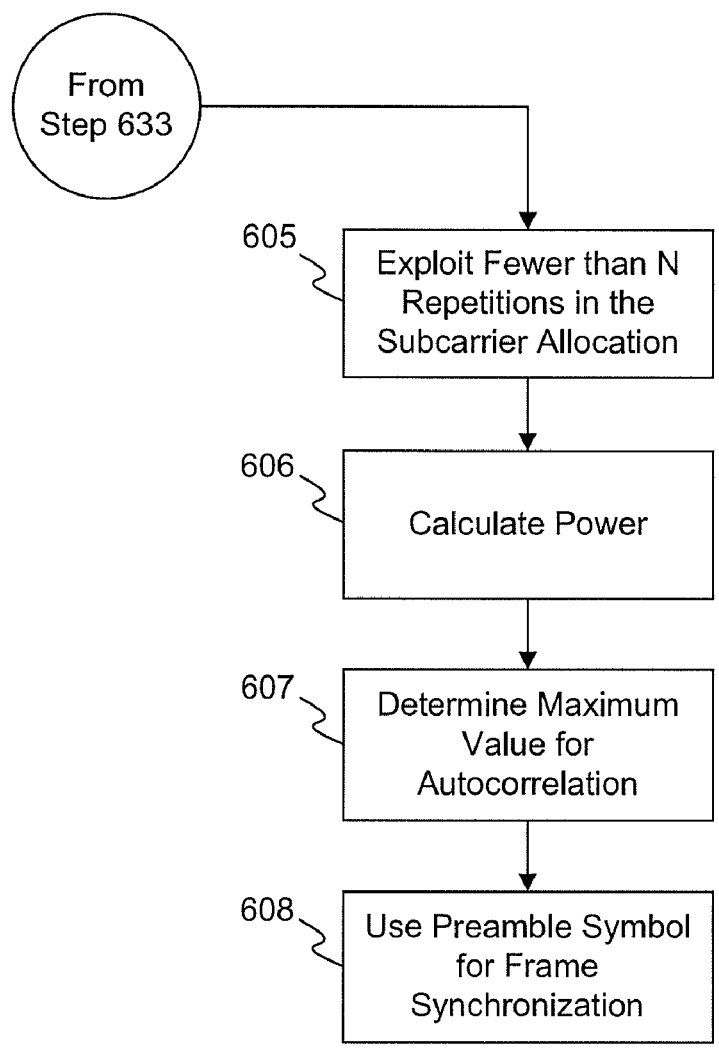
FIG. 6B is a flow diagram of a modified preamble symbol detection method, consistent with the present invention.

Turning to FIG. 6B, an alternative algorithm is shown in the flow diagram, and begins at E, after step 633. This alternative algorithm does not estimate the segment index numbers or the integer CFO until a later time. These features are lumped together and may not be differentiated, or the estimation of the segment index and integer CFO can be postponed until after the frame timing delay is obtained. This second alternative ML estimator focuses on the frame timing and fractional CFO. Here, the unknown CFO can have a non-zero integer part. Also, the ML estimator can be complex when trying to unwrap the phase shifts between all repeated signal portions to obtain the fractional CFO. To compensate for the complexity, at 605, another algorithm, simplified with respect to the first, is employed to use partial repetition information in the preamble. Therefore, fewer than N repetitions in the subcarrier allocation are exploited in step 605. The power can be calculated at step 606, and a maximum value for autocorrelation can be determined at step 607. At 608, both fractional CFO frame timing delay are obtained. The formulation for this partial repetition estimator is as follows:

$$\hat{\tau} = \arg\max_n \left\{ |y(n)| - \frac{1}{2}\rho\Phi(n) \right\}$$

$$\hat{\varepsilon} = \frac{\angle\gamma(\hat{\tau})}{2\pi} \times 3, \quad |\hat{\varepsilon}| \leq \frac{3}{2}, \quad \hat{\varepsilon}_{frac} = frac(\hat{\varepsilon})$$

This partial repetition estimator does not use a full signal repetition. Rather, it exploits only two repetitions in the preamble instead of the three repetitions exploited by the ML estimator of the first embodiment:

$$\gamma(n) = \sum_{m=n}^{((n+N/3-1))_{MN}} \left( y^*[m]y\left[m+\frac{N}{3}\right] + y^*\left[m+\frac{N}{3}\right]y\left[m+\frac{2N}{3}\right] \right) =$$

$$\sum_{m=n}^{((n+2N/3-1))_{MN}} y^*[m]y\left[m+\frac{N}{3}\right]$$

The phase shift between samples of signal portion 1, and samples of signal portion 2, is the same, and the phase shift between samples of signal portion 2 and samples of signal portion 3, is the same. Because of these phase shift similarities, the partial repetition estimator can find the similarity repeated between signal portion 1 and signal portion 2, and between signal portion 2 and signal portion 3. The similarity between signal portion 1 and signal portion 3 is discarded because the constant phase shift is double, therefore making the estimation of this latter comparison complicated.

For step 606, the power $\Phi(n)$ is calculated using:

$$\Phi(n) = \sum_{m=n}^{((n+N/3-1))MN} \left( |y[m]|^2 + 2 \times \left|y\left[m + \frac{N}{3}\right]\right|^2 + \left|y\left[m + \frac{2N}{3}\right]\right|^2 \right)$$

At 608, with the most likely signal portion samples containing the desired preamble symbol determined, frame synchronization can occur.

Other transmission and reception scenarios impact whether frame synchronization for WiMAX is possible. These include, for example: subcarrier totals in the preamble symbol structure that are not multiples of 3, such as totals of 512 or 1024; the existence of a cyclic prefix, guard-band subcarriers, or turnaround gaps between downlink and uplink frames; multipath fading channels; a large amount of unknown CFO before frame synchronization; signals from more than one segment are received at the same time; or, the SNR is unknown.

Figure 6C:
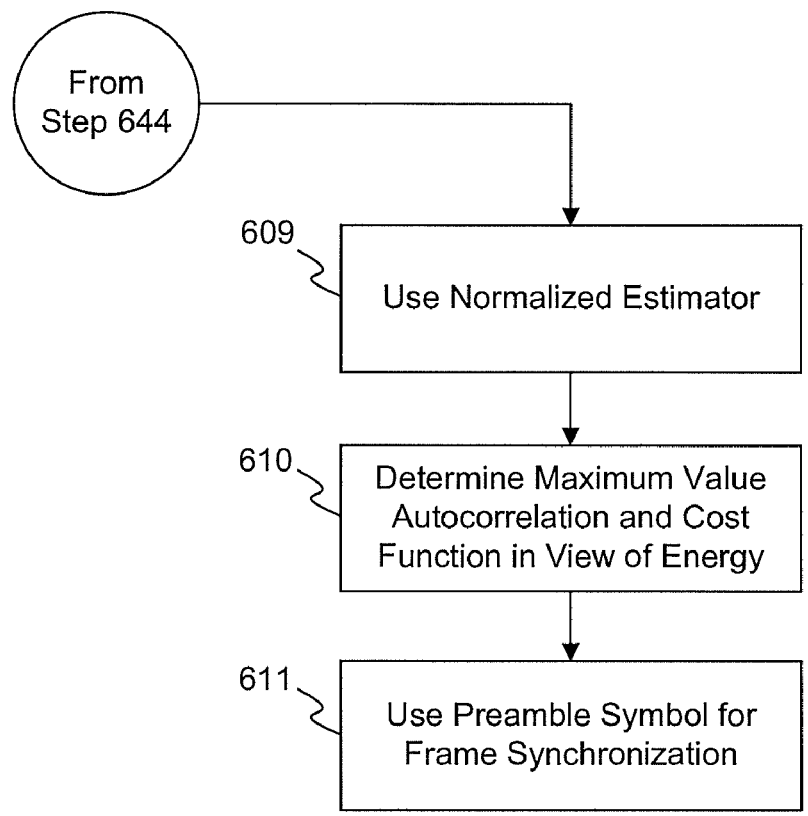
FIG. 6C is an alternative flow diagram of another modified preamble symbol detection method, consistent with the present invention.

Turning to FIG. 6C, another estimation method is presented when the signal-to-noise power ratio is unknown at receiver, at step 600 of FIG. 6A, which is typically true in practice. An alternative estimator is chosen at step 644, and at B, the method continues to step 609 of FIG. 6C. By normalizing the autocorrelation using the energy, at step 609, this algorithm does not require an estimate of SNR before frame synchronization and can be described as:

$$\hat{\tau} = \arg\max_n \{M_n\}$$

$$C_n = \sum_{m=n}^{n+\text{round}(2*N/3)-1} y^*[m] y\left[m + \text{round}\left(\frac{N}{3}\right)\right]$$

$$E_n = \sum_{m=n}^{n+N-1} |y[m]|^2$$

$$M_n = \frac{|C_n|}{E_n}$$

This third alternative frame synchronization algorithm uses a normalized estimator at 609 to find the biggest possible autocorrelation $C_n$ and cost function $M_n$ for the signal. The algorithm takes the energy $E_n$ into consideration, but without assuming a-priori knowledge of the SNR. The sample corresponding to the biggest cost function Mn is optimal.

Within the synchronization process, a sequence of samples with a length of frame duration, for example, 5 milliseconds, is observed. If the observation misses the preamble symbol, or, the observation does not begin at the beginning of the preamble, a longer observation window is needed, for example 6 milliseconds. At 610, the biggest autocorrelation $C_n$ and cost function Mn are determined for the sampled signal. At 611, the signal portion containing the preamble symbol is identified and frame synchronization can proceed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying a start of a preamble symbol, having a sequence length, in a time domain signal, the method comprising:
    sampling the signal in the time domain to obtain a plurality of samples;
    for each of the samples:
        forming a group of samples from the plurality of samples, the group of samples having the length of a preamble symbol;
        dividing the group into a plurality of portions; and
        calculating a likelihood value representing a correlation between the portions in the group; and
    identifying a first sample of the plurality of samples as the start of the preamble symbol, wherein the first sample is associated with a maximum likelihood value among each of the calculated likelihood values.

2. The method of claim 1, wherein the group of samples comprises successive consecutive samples having the length of the preamble symbol.

3. The method of claim 1, wherein calculating the likelihood value comprises:
    determining a frame timing delay and a segment index by maximizing:

$$(\hat{\tau}, \hat{s}) = \arg\max_{(n,p)} \{\gamma(n, p) - \rho\Phi(n)\}$$

where:

$$\gamma(n, p) = \text{Re}\left\{ \sum_{m=n}^{((n+N/3-1))MN} \left( y^*[m]y\left[m + \frac{N}{3}\right]e^{\frac{j2\pi p}{3}} + y^*\left[m + \frac{N}{3}\right]y\left[m + \frac{2N}{3}\right]e^{\frac{j2\pi p}{3}} + y^*\left[m + \frac{2N}{3}\right]y[m]e^{\frac{j4\pi p}{3}} \right) \right\},$$

$$\Phi(n) = \sum_{m=n}^{((n+N/3-1))MN} \left( |y[m]|^2 + \left|y\left[m + \frac{N}{3}\right]\right|^2 + \left|y\left[m + \frac{2N}{3}\right]\right|^2 \right),$$

and $\rho = \dfrac{\sigma_x^2}{\sigma_x^2 + \sigma_z^2}$, and where:
    the total number of segments is 3,
    n is a sample index assuming a Nyquist sampling rate of the received time domain signal,
    N is the total number of samples in a symbol given the Nyquist sampling rate,
    M is the number of symbols in the frame,
    y is the received signal sampled at the Nyquist rate,
    $\sigma_x^2$ is the average signal power, and
    $\sigma_z^2$ is the average noise power.

4. The method of claim 1, wherein calculating the likelihood value comprises:
    determining the frame timing delay by maximizing:

$$\hat{\tau} = \arg\max_n \left\{ |y(n)| - \frac{1}{2}\rho\Phi(n) \right\}$$

and determining a fractional carrier frequency offset according to:

$$\hat{\varepsilon} = \frac{\angle\gamma(\hat{\tau})}{2\pi} \times 3, \quad |\hat{\varepsilon}| \le \frac{3}{2}, \quad \hat{\varepsilon}_{frac} = frac(\hat{\varepsilon}),$$

-continued where:

$$\gamma(n) = \sum_{m=n}^{((n+N/3-1))MN} \left(y^*[m]y\left[m+\frac{N}{3}\right] + y^*\left[m+\frac{N}{3}\right]y\left[m+\frac{2N}{3}\right]\right) = $$

$$\sum_{m=n}^{((n+2N/3-1))MN} y^*[m]y\left[m+\frac{N}{3}\right]$$

$$\Phi(n) = \sum_{m=n}^{((n+N/3-1))MN} \left(|y[m]|^2 + 2 \times \left|y\left[m+\frac{N}{3}\right]\right|^2 + \left|y\left[m+\frac{2N}{3}\right]\right|^2\right),$$

and $\rho = \frac{\sigma_x^2}{\sigma_x^2 + \sigma_z^2}$, and where:
the total number of segments is 3,
n is a sample index assuming a Nyquist sampling rate,
N is the total number of samples in a symbol given the Nyquist sampling rate,
M is a number of symbols in the frame,
y is the received signal sampled at the Nyquist rate,
$\sigma_x^2$ is the average signal power, and
$\sigma_z^2$ is the average noise power.

5. The method of claim 1, wherein calculating the likelihood value comprises:
determining the frame timing delay by maximizing:

$$\hat{\tau} = \arg\max_n \{M_n\},$$

using a likelihood function defined according to:

$$M_n = \frac{|C_n|}{E_n},$$

using an autocorrelation defined according to:

$$C_n = \sum_{m=n}^{n+round(2*N/3)-1} y^*[m]y\left[m+round\left(\frac{N}{3}\right)\right], \text{ and}$$

calculating the power according to:

$$E_n = \sum_{m=n}^{n+N-1} |y[m]|^2,$$

where:
a total number of segments of the signal is 3,
n is a sample index assuming a Nyquist sampling rate,
N is the total number of samples in a symbol given the Nyquist sampling rate, and
y is the received signal sampled at the Nyquist rate.

6. The method of claim 1, wherein the time domain signal is transmitted and received, and is modeled according to:

$$y[n]=x_s[n-\tau]+z[n]$$

where:
y[n] is the time domain signal as received and sampled at the Nyquist rate n is a sample index
$x_s[n]$ is the time domain signal as transmitted assuming a segment s is used
z[n] is white Gaussian noise, and
$\tau$ is an unknown frame timing delay.

7. A method, in a communication signal with frames containing symbols at least one of the symbols being a preamble symbol, for synchronizing the frames and for determining a segment index of the communication signal, the method comprising:
estimating and compensating for a carrier frequency offset;
obtaining a signal-to-noise ratio;
sampling a time domain version of the communication signal to obtain a plurality of samples;
for each of the samples:
forming a group of samples from the plurality of samples, the group of samples having a length of a preamble symbol,
dividing the group into a plurality of portions; and
calculating a likelihood value representing a correlation between the portions in the group; and
identifying a first sample of the plurality of samples as a start of the preamble symbol, wherein the first sample is associated with a maximum likelihood value among each of the calculated likelihood values;
determining both a frame timing delay and a segment index; and
using the frame timing delay to synchronize the frames.

8. The method of claim 7, further comprising:
transmitting and receiving the time domain version of the communication signal,
wherein the frame timing delay and segment index are determined by maximizing a likelihood function where:

$$(\hat{\tau}, \hat{s}) = \arg\max_{(n,p)} \{\gamma(n, p) - \rho\Phi(n)\}$$

where:

$$\gamma(n, p) = $$

$$\text{Re}\left\{\sum_{m=n}^{((n+N/3-1))MN} \left(y^*[m]y\left[m+\frac{N}{3}\right]e^{\frac{j2\pi p}{3}} + y^*\left[m+\frac{N}{3}\right]y\left[m+\frac{2N}{3}\right]\right.\right.$$

$$\left.\left. e^{\frac{j2\pi p}{3}} + y^*\left[m+\frac{2N}{3}\right]y[m]e^{\frac{j4\pi p}{3}}\right)\right\},$$

$$\Phi(n) = \sum_{m=n}^{((n+N/3-1))MN} \left(|y[m]|^2 + \left|y\left[m+\frac{N}{3}\right]\right|^2 + \left|y\left[m+\frac{2N}{3}\right]\right|^2\right),$$

and $\rho = \frac{\sigma_x^2}{\sigma_x^2 + \sigma_z^2}$, and where:
the total number of segments is 3,
n is a sample index assuming a Nyquist sampling rate of the received time domain signal,
N is the total number of samples in a symbol given the Nyquist sampling rate,
M is the number of symbols in the frame,
y is the received signal sampled at the Nyquist rate,
$\sigma_x^2$ is the average signal power, and
$\sigma_z^2$ is the average noise power.

9. The method of claim 7, wherein the communication signal is an orthogonal frequency division mulitplexed communication signal.

10. The method of claim 7 further comprising the step of normalizing a carrier frequency offset before determining the segment index and the frame timing delay.

11. The method of claim 7 further comprising the step of estimating a carrier frequency offset characteristic of the sampled time domain signal and compensating for the carrier frequency offset characteristic before determining the segment index and the frame timing delay.

12. The method of claim 7 further comprising the step of obtaining a signal-to-noise power ratio before determining the segment index and the frame timing delay.

13. A method, in a communication signal containing frames with symbols at least one of the symbols being a preamble symbol, for synchronizing frames and for estimating a fractional carrier frequency offset of a communication signal, the method comprising:

obtaining a signal-to-noise ratio;
sampling a time domain version of the communication signal to obtain a plurality of samples;
for each of the samples:
 forming a group of samples from the plurality of samples, the group of samples having a length of a preamble symbol,
 dividing the group into a plurality of portions; and
 calculating a likelihood value representing a correlation between the portions in the group; and
identifying a first sample of the plurality of samples as a start of the preamble symbol, wherein the first sample is associated with a maximum likelihood value among each of the calculated likelihood values;
determining frame timing delay and fractional carrier frequency offset; and
using the frame timing delay to synchronize the frames.

14. The method of claim 13, further comprising:
transmitting and receiving the time domain version of the communication signal,
determining the frame timing delay by maximizing a likelihood function as:

$$\hat{\tau} = \arg\max_n \left\{ |y(n)| - \frac{1}{2}\rho\Phi(n) \right\}$$

and determining the fractional CFO according to:

$$\hat{\varepsilon} = \frac{L\gamma(\hat{\tau})}{2\pi} \times 3, \quad |\hat{\varepsilon}| \leq \frac{3}{2}, \quad \hat{\varepsilon}_{frac} = frac(\hat{\varepsilon}),$$

where:

$$\gamma(n) = \sum_{m=n}^{((n+N/3-1))MN} \left( y^*[m]y\left[m + \frac{N}{3}\right] + y^*\left[m + \frac{N}{3}\right]y\left[m + \frac{2N}{3}\right] \right) = \sum_{m=n}^{((n+2N/3-1))MN} y^*[m]y\left[m + \frac{N}{3}\right]$$

$$\Phi(n) = \sum_{m=n}^{((n+N/3-1))MN} \left( |y[m]|^2 + 2 \times \left|y\left[m + \frac{N}{3}\right]\right|^2 + \left|y\left[m + \frac{2N}{3}\right]\right|^2 \right),$$

and $\rho = \frac{\sigma_x^2}{\sigma_x^2 + \sigma_z^2}$, and where:
the total number of segments is 3,
n is a sample index assuming a Nyquist sampling rate,
N is the total number of samples in a symbol given the Nyquist sampling rate,
M is a number of symbols in the frame,
y is the received sample at the Nyquist rate,
$\sigma_x^2$ is the average signal power, and
$\sigma_z^2$ is the average noise power.

15. The method of claim 13, further comprising the step of obtaining a signal-to-noise power ratio before determining the frame timing delay and fractional carrier frequency offset.

16. The method of claim 13 wherein the frame timing delay and fractional carrier frequency offset are determined before obtaining a segment index and an integer carrier frequency offset characteristic.

17. A method for synchronizing frames of a communication signal containing symbols at least one of the symbols being a preamble symbol, without knowing a-priori a signal-to-noise ratio, the method comprising:

sampling a time domain version of the communication signal to obtain a plurality of samples;
for each of the samples:
 forming a group of samples from the plurality of samples, the group of samples having a length of a preamble symbol,
 dividing the group into a plurality of portions; and
 calculating a likelihood value representing a correlation between the portions in the group; and
identifying a first sample of the plurality of samples as a start of the preamble symbol, wherein the first sample is associated with a maximum likelihood value among each of the calculated likelihood values;
determining a frame timing delay; and
using the frame timing delay to synchronize frames of the communication signal.

18. The method of claim 17, further comprising:
transmitting and receiving the time domain version of the communication signal,
wherein the frame timing delay is determined by:
 maximizing a likelihood function where:

$$\hat{\tau} = \arg\max_n \{M_n\},$$

using a likelihood function defined according to:

$$M_n = \frac{|C_n|}{E_n},$$

using an autocorrelation defined according to:

$$C_n = \sum_{m=n}^{n+round(2*N/3)-1} y^*[m]y\left[m + round\left(\frac{N}{3}\right)\right], \text{ and}$$

calculating the power according to:

$$E_n = \sum_{m=n}^{n+N-1} |y[m]|^2,$$

where:
a total number of segments of the signal is 3,
n is a sample index assuming a Nyquist sampling rate, N is the total number of samples in a symbol given the Nyquist sampling rate, and y is the received signal sampled at the Nyquist rate.

19. The method of claim 17, wherein the frame timing delay is determined before a signal-to-noise power ratio is known.

20. The method of claim 17, wherein the frame timing delay of the received signal is determined before a segment index and a carrier frequency offset characteristic are determined.

* * * * *